(12) United States Patent
Muramatsu et al.

(10) Patent No.: US 8,085,306 B2
(45) Date of Patent: Dec. 27, 2011

(54) IMAGING APPARATUS HAVING A BIASING PART CONFIGURED TO GENERATE A BIASING FORCE TO BIAS A PART OF THE IMAGE PICKUP DEVICE

(75) Inventors: Koichi Muramatsu, Yokohama (JP); Takehide Ohno, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 504 days.

(21) Appl. No.: 12/357,866

(22) Filed: Jan. 22, 2009

(65) Prior Publication Data

US 2009/0189987 A1    Jul. 30, 2009

(30) Foreign Application Priority Data

Jan. 28, 2008  (JP) ................................ 2008-015938
Feb. 13, 2008  (JP) ................................ 2008-031594

(51) Int. Cl.
    *H04N 5/228* (2006.01)
(52) U.S. Cl. ................................................... 348/208.5
(58) Field of Classification Search ............... 348/208.5; 396/55; 720/663–679
    See application file for complete search history.

(56) References Cited

U.S. PATENT DOCUMENTS

| | | | | |
|---|---|---|---|---|
| 7,643,750 B2 * | 1/2010 | Irisawa et al. | ................. | 396/542 |
| 7,929,849 B2 * | 4/2011 | Ohno | ............................... | 396/55 |
| 2007/0154195 A1 * | 7/2007 | Irisawa et al. | .................. | 396/55 |

FOREIGN PATENT DOCUMENTS

| | | |
|---|---|---|
| JP | 2002-286035 | 10/2002 |
| JP | 2004-274242 | 9/2004 |

* cited by examiner

*Primary Examiner* — Jason Chan
*Assistant Examiner* — Gary C Vieaux
(74) *Attorney, Agent, or Firm* — Dickstein Shapiro LLP (57) ABSTRACT

The magnitude of magnetic attraction generated between an electromagnetic coil and a magnetic metal member (or an amount of electric current flowed to the electromagnetic coil) is controlled depending on a direction of acceleration (acceleration caused by the gravity (a gravitational acceleration) and acceleration caused by shake (shake acceleration)) working on an imaging apparatus. This magnetic attraction moves a second slider (including a CCD and a first slider) as a whole toward the electromagnetic coil. This movement brings two inclined surfaces (or fourth and fifth surfaces) of a shaft hole 10*d* into contact with a second guide shaft with no gap being interposed in between, and keeps the this contact condition.

10 Claims, 8 Drawing Sheets

| DIRECTION OF ACCELERATION (GRAVITATIONAL ACCELERATION, CAMERA SHAKE ACCELERATION) | X DIRECTION | Y DIRECTION | Z-AXIS DIRECTION | |
|---|---|---|---|---|
| | | | FRONTWARD DIRECTION OF LENS BARREL | REARWARD DIRECTION OF LENS BARREL |
| MAGNETIC ATTRACTION F (BIASING FORCE) | MEDIUM | SMALL | LARGE | ZERO |
| AMOUNT OF ELECTRIC CURRENT FLOWED TO ELECTROMAGNETIC COIL | MEDIUM | SMALL | LARGE | ZERO |

IMAGING APPARATUS HAVING A BIASING PART CONFIGURED TO GENERATE A BIASING FORCE TO BIAS A PART OF THE IMAGE PICKUP DEVICE

CROSS-REFERENCE TO THE RELATED APPLICATIONS

This application is based on and claims the priority benefit of each of Japanese Patent Application No. 2008-15938, filed on Jan. 28, 2008 and Japanese Patent Application No. 2008-31594, filed on Feb. 13, 2008, the disclosure of which is incorporated herein by reference in its entirety.

BACKGROUND OF THE INVENTION

1. Field of the Invention

The present invention relates to an imaging apparatus, such as a digital camera, which includes an image stabilization function for compensating camera shake while taking an image.

2. Description of the Related Art

These years, digital cameras each having an so-called image stabilization mechanism for compensating camera shake while photographing a subject have been in practical use in the field of digital cameras for imaging a subject image on an image pickup device (such as a CCD) by use of a photographing lens system, and thus for producing a digital image on the basis of an electric signal outputted from the image pickup device depending on the subject image.

For example, in a conventionally-known type of image stabilization mechanism for digital cameras, an image pickup device (such as a CCD) is moved in a plane (an X-Y plane) perpendicular to a direction of the optical axis of the photographing optical system, by an amount depending on how much a subject image shakes due to a camera shake (see Japanese Patent Application Publication No. 2004-274242, for instance).

An image stabilization mechanism disclosed in Japanese Patent Application Publication No. 2004-274242 includes two slider members which are arranged on a substrate fixed to the inside of the camera main body in a way that the two slider members are movable in plane directions (the X and Y-axis directions) perpendicular to the optical axis direction of the photographing lens system. An image pickup device is fixed to one of the two slider members. Depending on how much a subject image shakes due to a camera shake while photographing the subject, the two slider members are respectively moved in plane directions perpendicular to the optical axis of the photographing optical system. The movement of the two sliders moves the image pickup device in the plane perpendicular to the optical axis, thereby compensating the camera shake.

Note that the two slider members are movable in the plane directions (the X and Y-axis directions) perpendicular to the optical axis of the photographing optical system integrally with shaft bearings movably fitted to guide shafts arranged in the X and Y-axis directions, respectively.

However, in the technique according to the prior art, the outer diameters of the guide shafts and the inner diameters of shaft holes of the shaft bearings fitted to the guide shafts need to be processed with a higher dimensional precision for the purpose of moving the two slider members smoothly without looseness.

When even a slight gap exists between the guide shaft and the shaft hole of the shaft bearing due to an error or the like of the process precision of the guide shaft and shaft bearing, the guide shaft inserted in the shaft hole of the shaft bearing may be loosened during control for image stabilization. This brings about a problem of decreased precision of the image stabilization.

SUMMARY OF THE INVENTION

An object of the present invention is to provide an imaging apparatus capable of controlling image stabilization with higher precision and better follow-up performance without looseness between the guide shafts and the corresponding shaft bearings during control for the image stabilization.

For the purpose of fulfilling the object, an imaging apparatus according to an embodiment of the present invention includes: an image pickup device configured to receive a subject image entering through a photographing optical system, to image the subject image on a light receiving surface having a plurality of pixels, and to convert the subject image into an electric signal; a moving part configured to move the image pickup device, the moving part configured to retain the image pickup device movably in a plane perpendicular to an optical axis direction of the photographing optical system, the moving part including a guide shaft, a shaft bearing and an image pickup device fixing member for fixing the image pickup device thereto, the shaft bearing having a shaft hole in which the guide shaft is inserted, the shaft hole having at least two wall surfaces; a controller including a camera shake sensor, the controller configured to control the moving part configured to move the image pickup device on a basis of information on shake sensed by the camera shake sensor to move the image pickup device; a biasing part configured to generate a biasing force for biasing the image pickup device fixing member to bring the wall surfaces of the shaft hole into contact with the guide shaft; a biasing force controller configured to control the magnitude of the biasing force generated by the biasing part; and a posture sensor configured to sense the posture of the imaging apparatus while photographing the subject.

On the basis of information on the posture of the imaging apparatus sensed by the posture sensor while photographing the subject, the biasing force controller controls the biasing force generated by the biasing part.

DETAILED DESCRIPTION OF THE PREFERRED EMBODIMENTS

Preferred embodiments of the present invention will be explained in detail hereinafter with reference to the accompanying drawings.

First Embodiment

Figure 1:
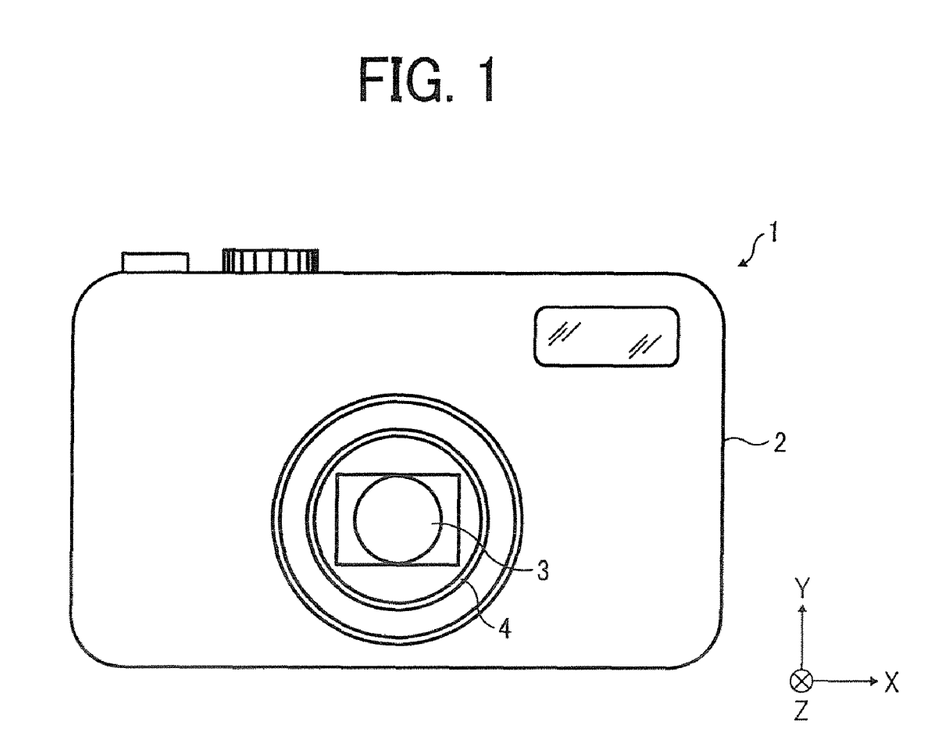
FIG. 1 is a front view showing a digital camera as an example of an imaging apparatus according to a first embodiment of the present invention.

FIG. 1 shows an example of a digital camera as an imaging apparatus according to a first embodiment of the present invention.

This digital camera includes an image stabilization function for compensating camera shake by moving an image pickup device in a plane perpendicular to a direction in which an optical axis of a photographing lens system extends. The image pickup device will be described later.

As shown in FIG. 1, the digital camera 1 includes a camera main body 2 and a lens barrel 4 provided in the front of the camera main body 2. A photographing lens system 3 that photographs an unillustrated subject is provided inside the lens barrel 4. The lens barrel 4 is configured so as to be movable between its collapsed position and image pickup standby position in a direction in which an optical axis of the photographing lens system 3 extends. The collapsed position causes the lens barrel 4 to be housed inside the camera main body 2. The image pickup standby position is a position where the lens barrel 4 is extended from the camera main body 2.

The photographing lens system 3 includes fixed lenses, a zoom lens, a focus lens and the like, although these lenses are not illustrated.

In addition to the photographing lens system 3, a shutter unit, an aperture stop unit and the like are placed inside the lens barrel 4, although these units are not illustrated.

For the following descriptions of the first embodiment, let us suppose that: an X-axis direction means the left-right direction of the digital camera 1 in FIG. 1; a Y-axis direction means the vertical direction of the digital camera 1 in FIG. 1; a Z-axis direction means the direction of the optical axis of the photographing optical system 3 in FIG. 1 (or a direction perpendicular to a sheet on which FIG. 1 is printed.

Figure 2:
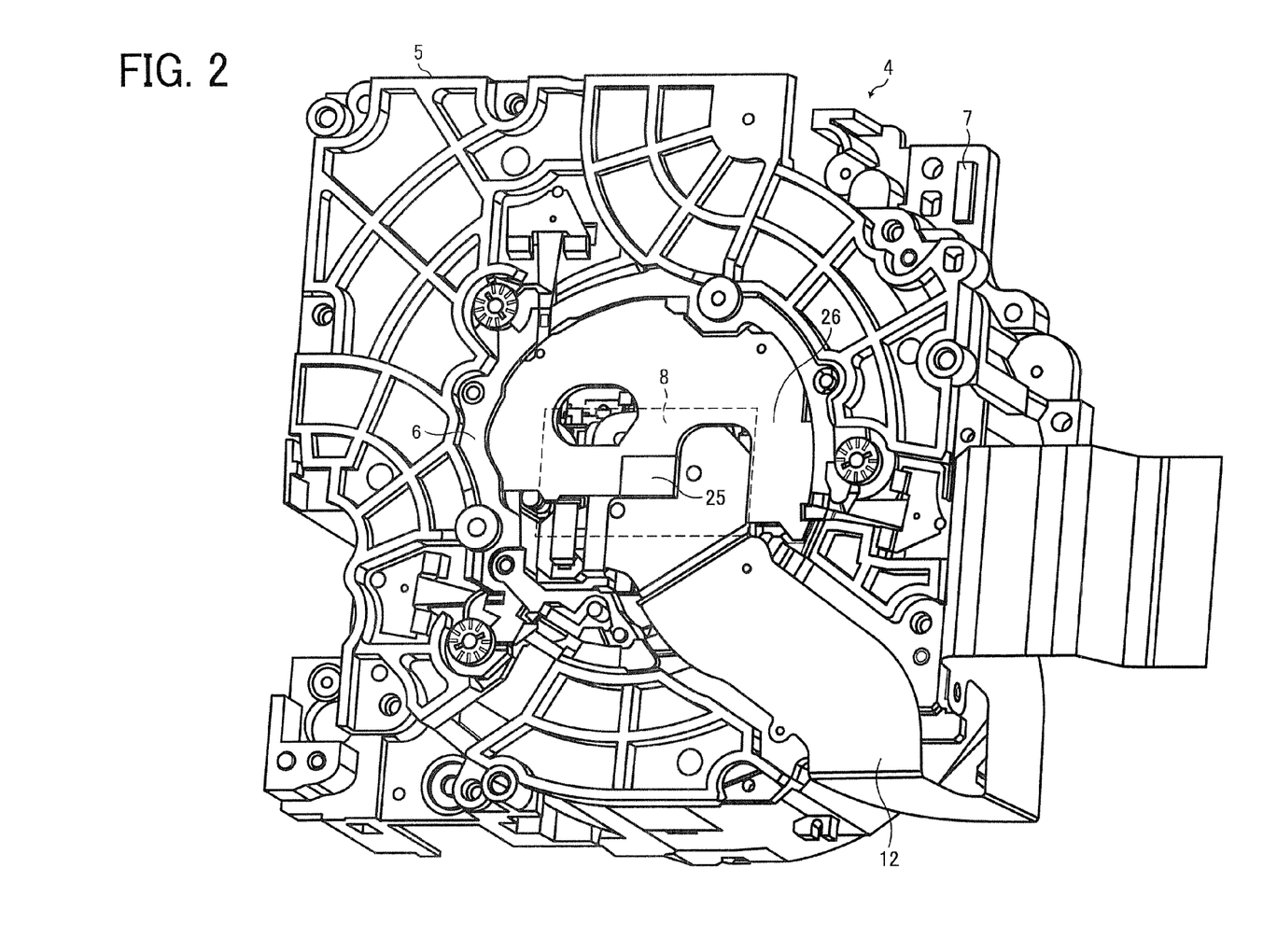
FIG. 2 is a perspective view showing a rear of a lens barrel.

FIG. 2 shows a rear of the lens barrel 4. As shown in FIG. 2, a substrate 5 fixed to the inside of the camera main body 2 is provided in the rear of the lens barrel 4. A CCD retaining frame 6 is placed in an opening center portion in the substrate 5. A posture sensor that senses the posture of the digital camera 1 while photographing is provided in a corner portion of the substrate 5. In the present embodiment, this posture sensor is configured of an acceleration sensor 7.

Figure 3:
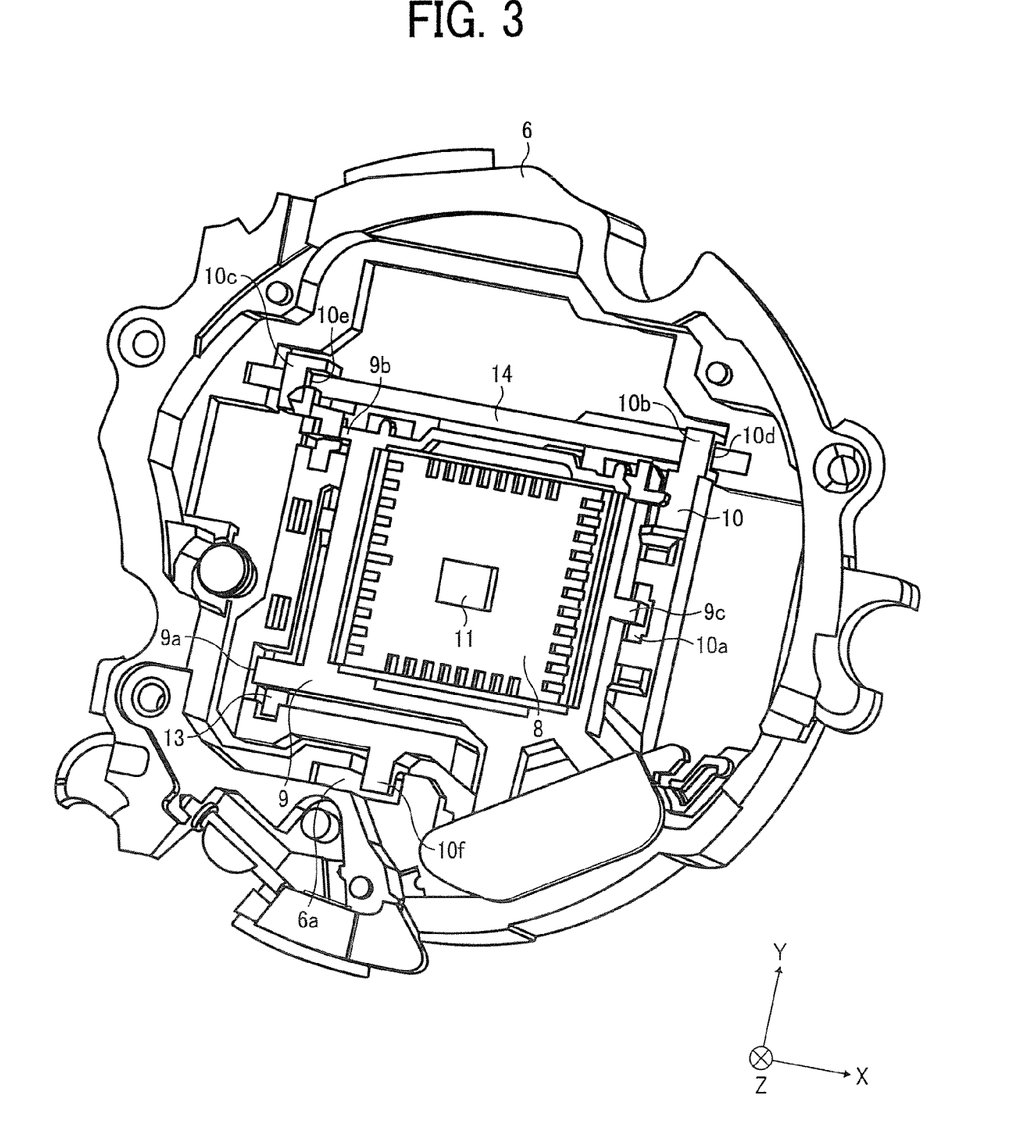
FIG. 3 is a perspective view showing a rear of a CCD retaining frame provided with a first slider to which a CCD is fixed and a second slider movably retaining the first slider.

As shown in FIG. 3, the CCD retaining frame 6 includes: a first slider 9 movable in the Y-axis direction, having the CCD 8 fixed to its opening center portion; and a second slider 10 retained by the CCD retaining frame 6 so as to be movable in the X-axis direction A subject image falling incident onto the CCD 8 through the photographing lens system 3 placed in the lens barrel 4 is imaged on a light receiving surface of the photographing lens system 3. A magnetic metal member 11 is adhered to a rear center portion of the CCD 8. An end of a flexible substrate 12 (see FIG. 2) whose other end is electrically connected to a signal processor (not shown) is connected to the rear of the CCD 8. In the first embodiment, as described above, the first slider 9 constitutes an image pickup device fixing member to which the CCD 8 is fixed.

Figure 4:
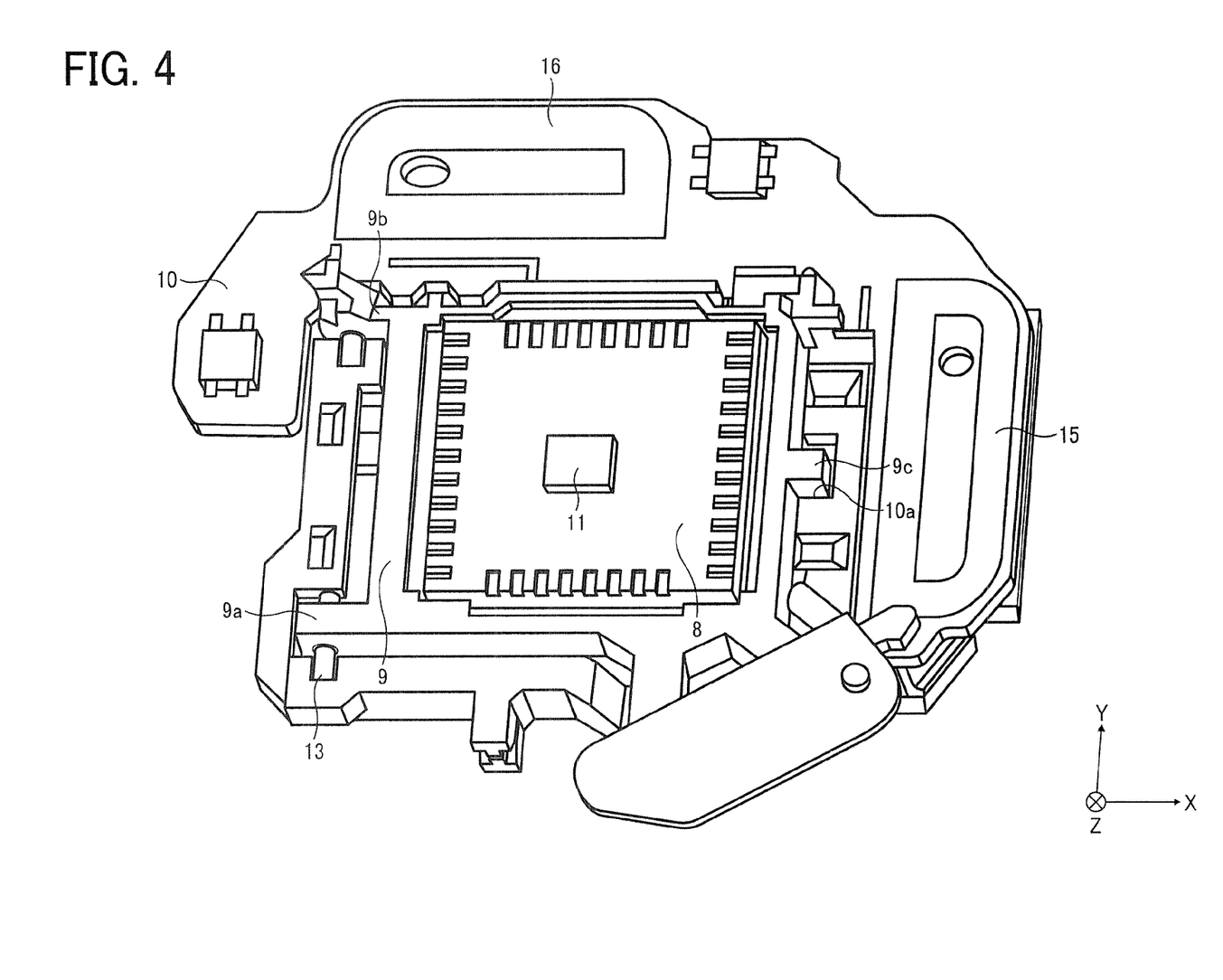
FIG. 4 is a perspective view showing the first slider to which the CCD is fixed and the second slider movably retaining the first slider.

As shown in FIGS. 3 and 4, paired shaft bearings 9*a*, 9*b* are formed in the first slider 9. A first guide shaft 13 fixed to the second slider 10 in the Y-axis direction is movably inserted in shaft holes (not shown) of the respective shaft bearings 9*a*, 9*b*. In addition, a guide protrusion 9*c* movable in the Y-axis direction inside a guide groove part 10*a* provided in the second slider 10 is formed in the opposite side of the first slider 9 from the shaft bearings 9*a*, 9*b*.

As shown in FIG. 3, paired shaft bearings 10*b*, 10*c* are formed in the second slider 10. A second guide shaft 14 fixed to the CCD retaining frame 6 in the X-axis direction is movably inserted in shaft holes 10*d*, 10*e* of the respective shaft bearings 10*b*, 10*c*. In addition, a guide protrusion 10*f* movable in the X-axis direction inside a guide groove part 6*a* provided in the CCD retaining frame 6 is formed in the opposite side of the second slider 10 from the shaft bearings 10*b*, 10*c*.

Figure 5:
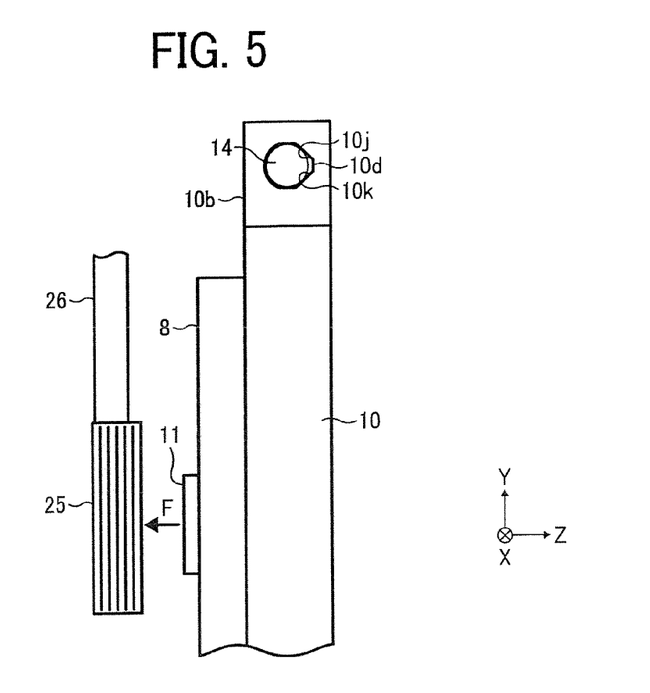
FIG. 5 is a schematic side view showing a magnetic metal member adhered to a center portion of the rear of the CCD and an electromagnetic coil arranged opposed to the magnetic metal member.
Figure 6:
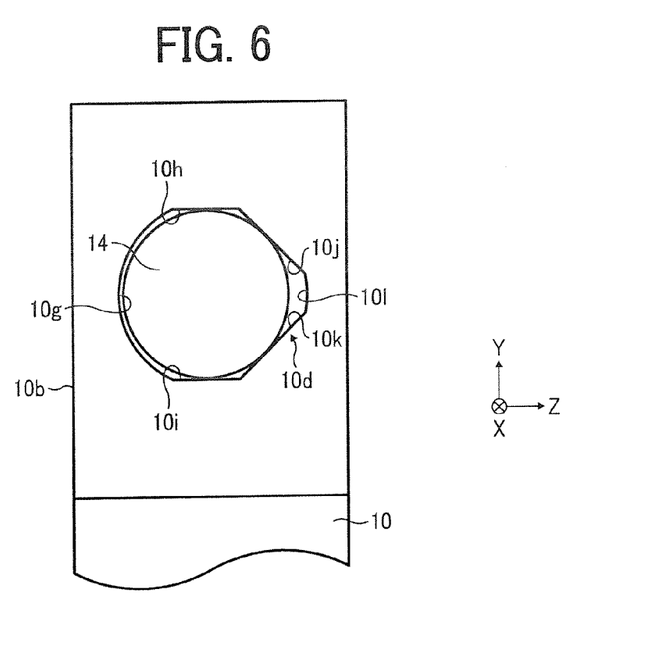
FIG. 6 is a magnified side view showing shaft holes of shaft bearings of the second slider with a second guide shaft being inserted in the shaft holes.

As shown in FIGS. 5 and 6, the shaft holes 10*d*, 10*e* of the shaft bearings 10*b*, 10*c* of the second slider 10 to which the second guide shaft 14 is movably inserted are (FIGS. 5 and 6 show the shaft hole 10*d* of the shaft bearing 10*b*) formed by including: a first surface 10*g* shaped like an arc; second and third surfaces 10*h*, 10*i* respectively shaped like parallel flat surfaces opposed to each other; fourth and fifth surfaces 10*j*, 10*k* respectively extending in directions toward the positive Z-axis direction (rightward in FIGS. 5 and 6) while inclined inward; and a 6th surface 10*l* formed in a curved shape between the fourth and fifth surfaces 10*j*, 10*k*. The second guide shaft 14 is inserted in this shaft hole 10*d* (10*e*) with a predetermined clearance.

A first coil 15 is integrally placed in an end portion of the first slider 9 in the Y-axis direction, whereas a second coil 16 is integrally placed in an end portion of the second slider 10 in the X-axis direction (see FIG. 4). In addition, a first magnet (not shown) and a second magnet (not shown) are placed in the CCD retaining frame 6 so as to be respectively opposed to the first coil 15 and the second coil 16.

The first slider 9 is movable in the Y-axis direction by use of a magnetic force generated between the first coil 15 and the first magnet (not shown) by controlling an electric current applied to the first coil 15, whereas the second slider 10 is movable in the X-axis direction by use of a magnetic force generated between the second coil 16 and the second magnet (not shown) by controlling an electric current applied to the second coil 16. Note that a position detection sensor 19, (see FIGS. 7 and 8) such as a hole element, that detects the positions of the first and second sliders 9, 10 are placed in the first and second sliders 9, 10, respectively.

In the first embodiment, as described above, a moving part configured to move the image pickup device that moves the COD 8 in a direction perpendicular to the optical axis of the photographing lens system 3 is configured by including: the first slider 9 arranged movably in the Y-axis direction; the second slider 10 arranged movably in the X-axis direction;

the first coil 15 and the first magnet (not shown) for moving the first slider 9 in the Y-axis direction; and the second coil 16 and the second magnet (not shown) for moving the second slider 10 in the X-axis direction.

Figure 7:
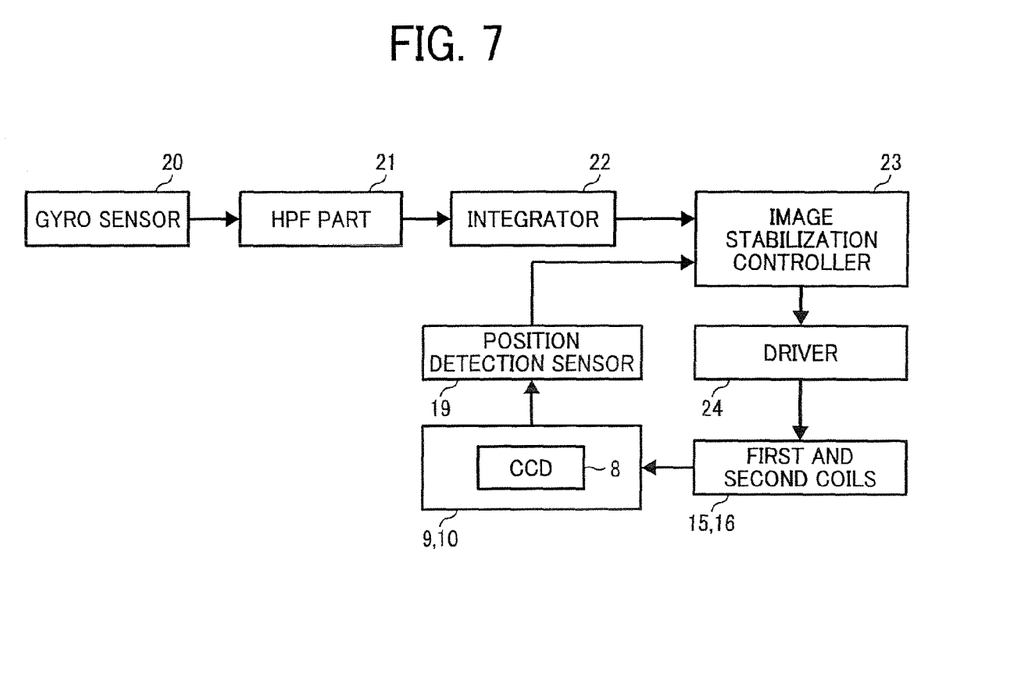
FIG. 7 is a block diagram showing a control system that controls image stabilization.

FIG. 7 shows a control system that controls image stabilization by moving the CCD 8.

While photographing a subject, shake of the digital camera 1 or the camera main body 2 is sensed with a gyro sensor 20 as a camera shake sensor placed inside the camera main body 2. Thereafter, a high-pass filter (HPF) 21 cuts off a low-frequency component from a camera shake detection signal representing the camera shake sensed with the gyro sensor 20. Subsequently, an integrator 22 applies an integration process to the camera shake detection signal. Afterward, the resultant signal is inputted into an image stabilization controller 23. In addition, position information (position signal) which indicates the positions of the first and second sliders 9, 10 detected with the respective position detection sensors 19 is inputted into the image stabilization controller 23.

The image stabilization controller 23 generates an image stabilization signal on the basis of the camera shake detection signal inputted into the image stabilization controller 23 through the gyro sensor 20, the HPF 21 and the integrator 22. Depending on the image stabilization signal thus generated, the image stabilization controller 23 controls an electric current applied to each of the first and second coils 15, 16 through a driver 24. Thus, the image stabilization controller 23 moves the first slider 9 in the Y-axis direction by use of a magnetic force generated between the first coil 15 and the first magnet (not shown) by controlling the electric current applied to the first coil 15, and moves the second slider 10 in the X-axis direction by use of a magnetic force generated between the second coil 16 and the second magnet (not shown) by controlling the electric current applied to the second coil 16. Thereby, the image stabilization controller 23 moves the CCD 8 in a direction which causes the CCD 8 to offset the camera shake.

In this respect, during an operation of the image stabilization, the image stabilization controller 23 controls the movement of the CCD 8 on the basis of the position information (position signal) of the first and second sliders 9, 10 detected by the position detection sensor 19.

Furthermore, as shown in FIG. 5, the digital camera 1 according to the first embodiment is provided with an electromagnetic coil 25 in a way that the electromagnetic coil 25 is opposed to the magnetic metal member 11 adhered to the center portion of the rear of the CCD 8. The magnetic metal member 11 is situated in a vicinity of the center of gravity of each of the CCD 8 and the second slider 10 retaining the first slider 9. The electromagnetic coil 25 is adhered to a front corner portion of a coil supporting member 26 (see FIG. 2) adhered to an outer periphery of the CCD retaining frame 6. When an electric current with a predetermined polarity is applied to the electromagnetic coil 25, a magnetic attraction F is generated between the electromagnetic coil 25 and the magnetic metal member 11. The attraction oriented toward the electromagnetic coil 25 works on the CCD 8 and the second slider 10 retaining the first slider 9.

In the first embodiment, as described above, the magnetic metal member 11 and the electromagnetic coil 25 constitute the magnetic biasing part. Note that the magnetic attraction F is described as a biasing force for the first embodiment.

Figure 8:
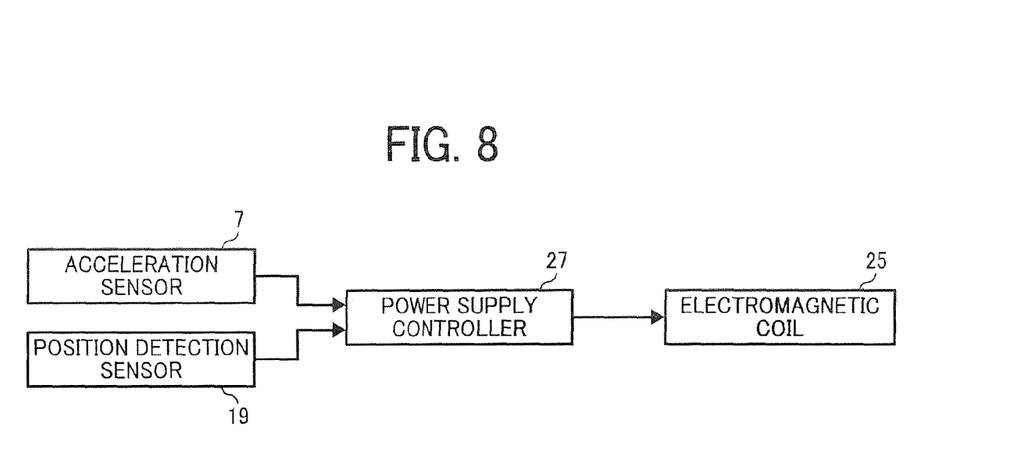
FIG. 8 is a block diagram showing a control system that controls supply of electric current to an electromagnetic coil.

FIG. 8 shows a control system that controls supply of electric current to the electromagnetic coil 25. As shown in FIG. 8, a power supply controller 27 that controls supply of electric current to the electromagnetic coil 25 controls the amount of electric current (the magnitude of magnetic attraction F) flowed to the electromagnetic coil 25, to described later, on the basis of acceleration information working on the digital camera 1 which is inputted from the acceleration sensor 7. Note that the power supply controller 27 simultaneously receives the position information (position signal) on the positions of the first and second sliders 9, 10 from the position detection sensor 19, and thus controls the supply of electric current to the electromagnetic coil 25 in response to the movement of the first and second sliders 9, 10 during the operation of the image stabilization.

The digital camera 1 according to the first embodiment is configured as described above. Thus, in a case where the digital camera 1 shakes while photographing a subject, the digital camera 1 controls the electric current applied to each of the first and second coils 15, 16 on the basis of the camera shake detection signal detected by the gyro sensor 20. Through controlling the applied electric current, the magnetic force is generated between the first coil 15 and the first magnet (not shown) arranged opposed to the first coil 15, and concurrently between the second coil 16 and the second magnet (not shown) arranged opposed to the second coil 16. By use of the magnetic force, the first slider 9 and the second slider 10 respectively move in the Y-axis direction and the X-axis direction in order to offset the camera shake. Thereby, the digital camera 1 compensates the camera shake by causing the CCD 8 to responsively move to a position where a subject image shakes due to the camera shake.

During the operation of the image stabilization, as described above, the first slider 9 moves along the first guide shaft 13 in the Y-axis direction, and the second slider 10 moves along the second guide shaft 14 along the X-axis direction, depending on how much the camera shakes. If a gap exists between the second guide shaft 14 and the shaft holes 10*d*, 10*e* of the respective shaft bearings 10*b*, 10*c*, this gap may cause the second slider 10 loose while the second slider 10 is moving. As a result, this looseness causes an error in the amount of image stabilization. Furthermore, this looseness causes a time lag when the second slider 10 moves. Accordingly, this time lag makes the digital camera 1 incapable of controlling the image stabilization with a better follow-up performance.

Moreover, if a gap exists between the first guide shaft 13 (see FIG. 4) and the shaft holes (not shown) of the respective shaft bearings 9*a*, 9*b*, similarly, this gap may cause the first slider 9 loose while the first slider 9 is moving. As a result, this looseness causes an error in the amount of image stabilization. Furthermore, this looseness causes a time lag when the first slider 9 moves. Accordingly, this time lag makes the digital camera 1 incapable of controlling the image stabilization with a better follow-up performance.

With these taken into consideration, the first embodiment causes the digital camera 1 to control the magnitude of the magnetic attraction F (or the amount of electric current flowed to the electromagnetic coil 25) generated between the electromagnetic coil 25 and the magnetic metal member 11, to described below, depending on a direction of acceleration working, while photographing a subject, on the digital camera 1 (including acceleration generated by the gravity (a gravitational acceleration) and acceleration (a camera shake acceleration) generated due to camera shake.

Even in a case where controlling the amount of the electric current flowed to the electromagnetic coil 25 causes acceleration (a gravitational acceleration or a camera shake acceleration) to work on the digital camera 1 in any one of the X-axis, Y-axis and Z-axis directions while photographing a subject, the two inclined surfaces (the fourth and fifth surfaces 10*j*, 10*k*) of the shaft hole 10*d* are brought into contact with the second guide shaft 14 with a predetermined and minimum magnitude of contact force, as shown in FIG. 6 (this is the case with the shaft hole 10e as well). Note that the contact force is a force working between the two inclined surfaces (or the fourth and fifth surfaces 10j, 10k) of the shaft hole 10d (and the shaft hole 10e) and the second guide shaft 14, and also is a force obtained by combining the magnetic attraction F (or the biasing force), the gravity, an inertia force occurring due to camera shake, and the like together.

Figure 9:
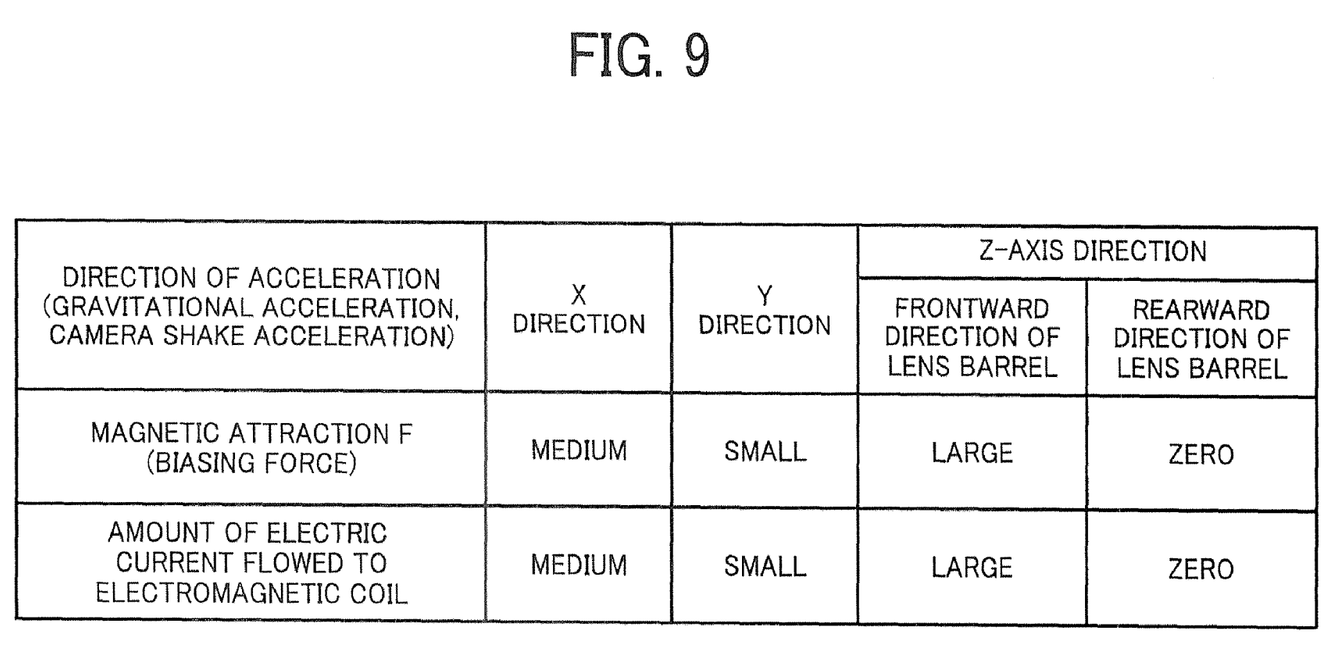
FIG. 9 is a diagram showing the amount of electric current flowed to the electromagnetic coil, and the magnitude of magnetic attraction generated by the electric current flowed to the electromagnetic coil, depending on acceleration working on the digital camera.

FIG. 9 shows an amount of electric current (among four levels of zero, small, medium and large in the case of the first embodiment) flowed to the electromagnetic coil 25, and a magnitude of magnetic attraction F (the biasing force) (among four levels of zero, small, medium and large in the case of the first embodiment) generated by the electric current flowed to the electromagnetic coil 25, depending on acceleration (a gravitational acceleration or a camera shake acceleration) working on the digital camera 1 in any one of the X-axis, Y-axis and Z-axis direction while photographing a subject.

(In the Case where Acceleration Works in the X-Axis Direction)

This is a case where, the camera is held vertically (or the camera is held in a way that the X-axis direction coincides with the vertical direction) for photographing a subject, a gravitational acceleration accordingly works on the camera in the X-axis direction, or acceleration works on the camera in the X-axis direction because the camera shakes, or because the photographer is moving with the camera.

When the power supply controller 27 determines that acceleration (a gravitational acceleration or a camera shake acceleration) works on the camera in the X-axis direction on the basis of information on acceleration which is inputted from the acceleration sensor 7, the power supply controller 27 controls the application of the electric current to the electromagnetic coil 25 so that the amount of the electric current is to be a predetermined amount (medium among four levels of zero, small, medium and large in the present embodiment). Thereby, the power supply controller 27 generates a medium magnitude of magnetic attraction F between the electromagnetic coil 25 and the magnetic metal member 11.

This magnetic attraction F directly works on the first slider 9 to which the magnetic metal member 11 is fixed, and the first slider 9 is accordingly biased toward the electromagnetic coil 25. This eliminates looseness between the first guide shaft 13 and the first slider 9. In addition, the first guide shaft 13 is biased toward the electromagnetic coil 25 by the magnetic attraction F as well. In other words, the second slider 10 to which the first guide shaft 13 is fixed is biased toward the electromagnetic coil 25 as well. This eliminates looseness between the second slider 10 and the second guide shaft 14.

This magnetic attraction F moves the second slider 10 (including the CCD 8 and the first slider 9) as a whole toward the electromagnetic coil 25. This movement brings the two inclined surfaces (or the fourth and fifth surfaces 10j, 10k) of the shaft hole 10d into contact with the second guide shaft 14 with a predetermined and minimum magnitude of contact force with no gap being interposed in between, and keeps this contact condition (this is the case with the shaft hole 10e as well). This contact causes the second slider 10 to smoothly move along the second guide shaft 14 in the X-axis direction without looseness even in a case where the acceleration (the gravitational acceleration or the camera shake acceleration) works on the camera in the X-axis direction during the operation of the image stabilization. In addition, similarly, the first slider 9 smoothly moves along the first guide shaft 13 in the Y-axis direction without looseness as well.

(In a Case where Acceleration Works in the Y-Axis Direction)

This is a case where, the camera is held horizontal (in a way that the Y-axis direction coincides with the vertical direction) for photographing a subject, and a gravitational acceleration accordingly works on the camera in the Y-axis direction, or acceleration works on the camera in the Y-axis direction because the camera shakes, or because the photographer is moving with the camera.

When the power supply controller 27 determines that acceleration (a gravitational acceleration or a camera shake acceleration) works on the camera in the Y-axis direction on the basis of information on acceleration which is inputted from the acceleration sensor 7, the power supply controller 27 controls the electric current application so that the electromagnetic coil 25 is supplied with an predetermined amount of electric current (at a small level among the four levels of zero, small, medium and large in the present embodiment) that is a smaller amount than in the case where the acceleration works in the X-axis direction. Thereby, the power supply controller 27 generates a smaller magnetic attraction F between the electromagnetic coil 25 and the magnetic metal member 11, than that generated when the acceleration direction coincides with the X-axis direction.

This magnetic attraction F directly works on the first slider 9 to which the magnetic metal member 11 is fixed, and the first slider 9 is accordingly biased toward the electromagnetic coil 25. This eliminates looseness between the first guide shaft 13 and the first slider 9. In addition, the first guide shaft 13 is biased toward the electromagnetic coil 25 by the magnetic attraction F as well. In other words, the second slider 10 to which the first guide shaft 13 is fixed is biased toward the electromagnetic coil 25. This eliminates looseness between the second slider 10 and the second guide shaft 14.

This magnetic attraction F moves the second slider 10 (including the CCD 8 and the first slider 9) as a whole toward the electromagnetic coil 25. This movement brings the two inclined surfaces (or the fourth and fifth surfaces 10j, 10k) of the shaft hole 10d into contact with the second guide shaft 14 with a predetermined and minimum magnitude of contact force with no gap being interposed in between, and keeps this contact condition (this is the case with the shaft hole 10e as well). This contact causes the second slider 10 to smoothly move along the second guide shaft 14 in the X-axis direction without looseness even in the case where the acceleration (the gravitational acceleration or the camera shake acceleration) works on the camera in the Y-axis direction during the operation of the image stabilization. In addition, similarly, the first slider 9 smoothly moves along the first guide shaft 13 in the Y-axis direction without looseness as well.

(In the Case where Acceleration Works in the Z-Axis Direction)

This is a case where, the camera is held upward or downward in the vertical direction for photographing a subject, and a gravitational acceleration accordingly works on the camera in the Z-axis direction, or acceleration works on the camera in the Z-axis direction because the camera shakes, or because the photographer is moving with the camera.

In a case where acceleration (a gravitational acceleration or a camera shake acceleration) works on the digital camera 1 in the positive Z-axis direction (or frontward direction of the lens barrel 4 of the digital camera 1), a magnetic attraction F which is larger in magnitude than the gravitational load of the second slider 10 (including the CCD 8 and the first slider 9) need to be generated.

For this reason, when the power supply controller 27 determines that acceleration (a gravitational acceleration or a camera shake acceleration) works on the digital camera 1 in the positive Z-axis direction (or frontward direction of the lens barrel 4 of the digital camera 1) on the basis of information on acceleration which is inputted from the acceleration sensor 7, the power supply controller 27 controls the electric current application so that the electromagnetic coil 25 is supplied with an predetermined amount of electric current (at a large level among four levels of zero, small, medium and large in the first embodiment) which is larger in magnitude than the gravitational load of the second slider 10 (including the CCD 8 and the first slider 9). Thereby, the power supply controller 27 causes a magnetic attraction F which is larger in magnitude than the gravitational load of the second slider 10 (including the CCD 8 and the first slider 9) to work between the electromagnetic coil 25 and the magnetic metal member 11.

This magnetic attraction F directly works on the first slider 9 to which the magnetic metal member 11 is fixed, and the first slider 9 is accordingly biased toward the electromagnetic coil 25. This eliminates looseness between the first guide shaft 13 and the first slider 9. In addition, the first guide shaft 13 is biased toward the electromagnetic coil 25 by the magnetic attraction F as well. In other words, the second slider 10 to which the first guide shaft 13 is fixed is biased toward the electromagnetic coil 25 as well. This eliminates looseness between the second slider 10 and the second guide shaft 14.

This magnetic attraction F moves the second slider 10 (including the CCD 8 and the first slider 9) as a whole toward the electromagnetic coil 25. This movement brings the two inclined surfaces (or the fourth and fifth surfaces 10j, 10k) of the shaft hole 10d into contact with the second guide shaft 14 with a predetermined and minimum magnitude of contact force with no gap being interposed in between, and keeps this contact condition (this is the case with the shaft hole 10e as well).

Furthermore, in the case where the acceleration (the gravitational acceleration or the camera shake acceleration) works on the digital camera 1 in the negative Z-axis direction (or rearward direction of the lens barrel 4 of the digital camera 1), the gravitational load of the second slider 10 (including the CCD 8 and the first slider 9) brings the two inclined surfaces (or the fourth and fifth surfaces 10j, 10k) of the shaft hole 10d into contact with the second guide shaft 14 with no gap being interposed in between (this is the case with the shaft hole 10e as well).

For this reason, when the power supply controller 27 determines that the acceleration (the gravitational acceleration or the camera shake acceleration) works on the digital camera 1 in the negative Z-axis direction (or rearward direction of the lens barrel 4 of the digital camera 1) on the basis of information on acceleration which is inputted from the acceleration sensor 7, the power supply controller 27 controls the electric current application so as to apply no electric current to the electromagnetic coil 25. Thereby, the power supply controller 27 generates no biasing force which depends on the magnetic attraction F.

This causes the second slider 10 to smoothly move along the second guide shaft 14 in the X-axis direction without looseness, even in the case where the acceleration (the gravitational acceleration or the camera shake acceleration) works on the camera in the Z-axis direction during the operation of the image stabilization. In addition, similarly, the first slider 9 smoothly moves along the first guide shaft 13 in the Y-axis direction without looseness.

In this manner, the two inclined surfaces (or the fourth and fifth surfaces 10j, 10k) of the shaft hole 10d is always capable of coming into contact with the second guide shaft 14 with an appropriate contact force, even in the case where acceleration (acceleration (gravitational acceleration) occurring due to the gravitation or acceleration (camera shake acceleration) occurring due to camera shake) works on the digital camera 1 in any one of the X-axis, Y-axis and Z-axis directions while photographing a subject (this is the case with the shaft hole 10e as well).

Thereby, the digital camera 1 is capable of smoothly moving the second slider 10 along the second guide shaft 14 in the X-axis direction, and the first slider 9 along the first guide shaft 13 in the Y-axis direction, without looseness, when photographing a subject. Accordingly, the digital camera 1 is capable of controlling the image stabilization with a higher precision, and with a better follow-up performance.

Second Embodiment

Figure 10:
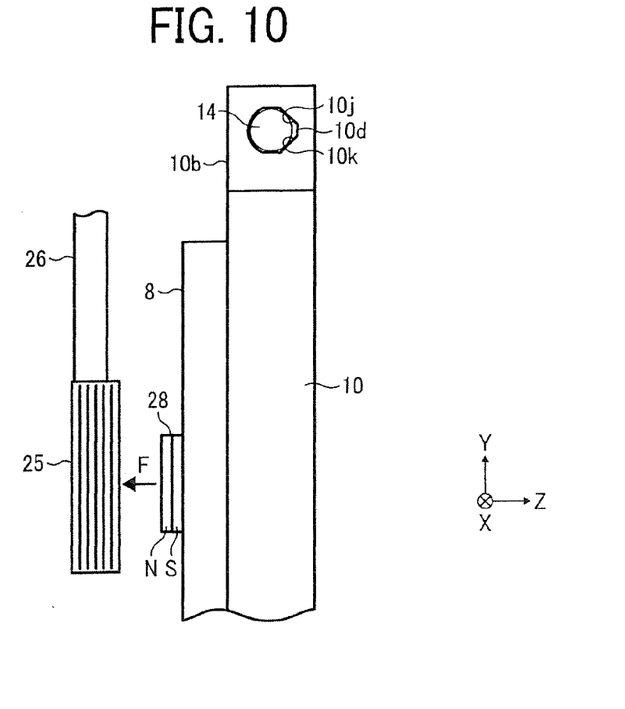
FIG. 10 is a schematic side view showing a permanent magnet adhered to a center portion in the rear of a CCD and an electromagnetic coil arranged opposed to the permanent magnet according to a second embodiment of the present invention.

The digital camera 1 according to the first embodiment has the configuration in which the magnetic metal member 11 is adhered to the center portion in the rear of the CCD 8. By contrast, the digital camera 1 according to the second embodiment has a configuration in which a permanent magnet 28 is adhered to the center portion in the rear of the CCD 8 as shown in FIG. 10. The rest of the configuration according to the second embodiment is the same as that according to the first embodiment. For this reason, duplicated descriptions will be omitted.

By causing an electric current with a predetermined polarity to be applied to the electromagnetic coil 25, the digital camera 1 according to the second embodiment is capable of generating an attractive magnetic force F between the electromagnetic coil 25 and the permanent magnet 28 in the same manner as the digital camera 1 according to the first embodiment is. In this manner, the digital camera 1 according to the second embodiment controls the amount of electric current flowing to the electromagnetic coil 25 as shown in FIG. 8 in a case where acceleration (a gravitational acceleration, or a camera shake acceleration) works on the digital camera 1 in any one of the X-axis, Y-axis and Z-axis directions while photographing a subject.

Thereby, the digital camera 1 keeps the two inclined surfaces (or the fourth and fifth surfaces 10j, 10k) of the shaft hole 10d of the shaft bearing 10b contacting with the second guide shaft 14 with a predetermined and minimum magnitude of contact force with no gap being interposed in between (this is the case with the other shaft bearings). Consequently, even in the case where acceleration (a gravitational acceleration or a camera shake acceleration) works on the digital camera 1 in any one of the X-axis, Y-axis and Z-axis directions during the operation of the image stabilization, the second slider 10 smoothly moves along the second guide shaft 14 in the X-axis direction without looseness. In addition, similarly, the first slider 9 smoothly moves along the first guide shaft 13 in the Y-axis direction without looseness as well.

In sum, the digital camera 1 according to the second embodiment is similarly capable of smoothly moving the second slider 10 along the second guide shaft 14 in the X-axis direction, and the first slider 9 along the first guide shaft 13 in the Y-axis direction, without looseness during the operation of the image stabilization. Accordingly, the digital camera 1 according to the second embodiment is capable of controlling the image stabilization with a higher precision and with a better follow-up performance.

In addition, the digital camera 1 according to the second embodiment is capable of generating a reactive magnetic force between the electromagnetic coil 25 and the permanent magnet 28 by temporarily changing the polarity of the electric current flowed to the electromagnetic coil 25 for generating the attractive magnetic force to the opposite polarity.

For this reason, when the digital camera 1 is held upward in the vertical direction, the digital camera 1 is capable of reducing the contact force with which the two inclined surfaces (or the fourth and fifth surfaces 10j, 10k) of the shaft hole 10d is in contact with the second guide shaft 14 due to the gravitational load of the second slider 10 (including the CCD 8 and the first slider 9) by generating a reactive magnetic force with the polarity of the electric current flowed to the electromagnetic coil 25 being reversed (this is case with the shaft hole 10e as well). Thereby, the digital camera 1 is capable of decreasing a frictional force which occurs while moving the second slider 10 along the second guide shaft 14, and accordingly capable of moving the second guide shaft 14 more smoothly, when the digital camera 1 is held upward in the vertical direction during the operation of the image stabilization.

The foregoing embodiment causes the digital camera 1 to have the configuration in which the magnetic member (the magnetic metal member 11 or the permanent magnet 25) is fixed to the rear of the CCD 8 fixed to the first slider 9, and in which the attractive magnetic force F biases the first slider 9 to which the magnetic member (the magnetic metal member 11 or the permanent magnet 25) is fixed. However, the location of the magnetic member (the magnetic metal member 11 or the permanent magnet 25) on which the attractive magnetic force F works is not limited to the first slider 9.

For example, the digital camera 1 may have a configuration in which the magnetic member (the magnetic metal member 11 or the permanent magnet 25) is fixed to a predetermined location in the second slider 10. Otherwise, the digital camera may have a configuration in which the attractive magnetic force F directly works on the first slider 9 or the second slider 10 by forming part of the first slider 9 or the second slider 10 by use of a magnetic metal material.

Third Embodiment

Figure 11:
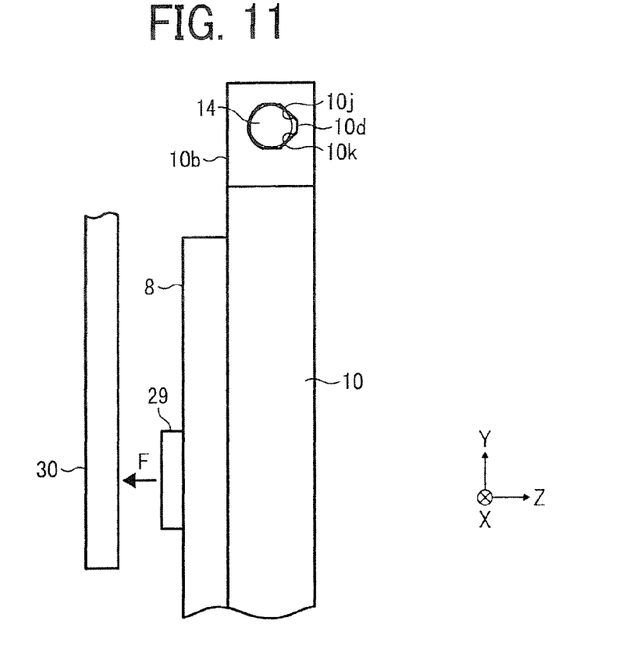
FIG. 11 is a schematic side view showing a permanent magnet adhered to a center portion in the rear of a CCD and a magnetic metal plate arranged opposed to the permanent magnet according to a third embodiment of the present invention.

A digital camera according to the third embodiment has a configuration in which, as shown in FIG. 11, a permanent magnet 29 is fixed to a center portion of the rear of the CCD 8 and a magnetic metal plate 30 is arranged opposed to this permanent magnet 29. This magnetic metal plate 30 is fixed to the CCD retaining frame 6 (see FIG. 2), like the coil supporting member 26 shown in FIG. 2. In this way, the biasing part includes the permanent magnet 29 and the magnetic metal plate 30 in the third embodiment.

However, the digital camera according to the third embodiment does not include the acceleration sensor that senses acceleration working on the digital camera, the electromagnetic coil that generates the magnetic attraction (or the biasing force) between the electromagnetic coil and the magnetic metal plate arranged opposed to the electromagnetic coil, or the power supply controller (see FIG. 8) that controls the passage of electric current to the electromagnetic coil, although these three components are included in the digital camera according to the first embodiment. The rest of the configuration of the digital camera according to the third embodiment is the same as that according to the first embodiment. For this reason, duplicated descriptions will be omitted.

Unlike the digital camera according to the first embodiment, the digital camera according to the third embodiment has the configuration in which, as shown in FIG. 11, a certain attractive magnetic force F (or the biasing force) is generated between the permanent magnet 29 and the magnetic metal plate 30 by use of the permanent magnet 29 instead of using the electromagnetic coil that generates a magnetic attraction through controlling the passage of electric current to the electromagnetic coil. Thereby, the certain attractive magnetic force F generated between the permanent magnet 29 and the magnetic metal plate 30 keeps the two inclined surfaces (or the fourth and fifth surfaces 10j, 10k) of the shaft hole 10d of the shaft bearing 10b contacting with the second guide shaft 14 with a predetermined contact force with no gap being interposed in between (this is the case with the other shaft bearings as well). Furthermore, in the shaft bearings 9a, 9b (see FIG. 3) of the first slider 9, similarly, the certain attractive magnetic force F keeps the shaft holes (not shown) of the shaft bearings 9a, 9b contacting with the first guide shaft 13 with a predetermined contact force with no gap being interposed in between.

Thereby, the digital camera according to the third embodiment is capable of smoothly moving the second slider 10 along the second guide shaft 14 in the X-axis direction, and the first slider 9 along the first guide shaft 13 in the Y-axis direction, without looseness even in the case where acceleration (a gravitational acceleration or a camera shake acceleration) works on the digital camera in any one of the X-axis, Y-axis and Z-axis directions during the operation of the image stabilization. Accordingly, the digital camera according to the third embodiment is capable of controlling the image stabilization with a higher precision and with a better follow-up performance.

The present invention allows the imaging apparatus to control the biasing force generated by the biasing part on the basis of information on the posture of the imaging apparatus which is detected by the posture sensor while the imaging apparatus is photographing a subject. For this reason, the imaging apparatus of the present invention is capable of changing the biasing force for bringing the two wall surfaces of each shaft hole into contact with the corresponding guide shaft depending on the posture of the imaging apparatus while the imaging apparatus is photographing the subject.

Thereby, the imaging apparatus brings the two wall surfaces of each shaft hole into contact with the corresponding guide shaft regardless of the posture of the imaging apparatus while the imaging apparatus is photographing the subject. For this reason, the imaging apparatus is capable of smoothly moving the guide shafts without looseness.

Furthermore, the imaging apparatus is capable of easily generating the biasing force for bringing the two wall surfaces of each shaft hole into contact with the corresponding guide shaft by the magnetic attraction in a non-contact manner.

The imaging apparatus is capable of easily controlling the magnitude of the magnetic attraction generated between the electromagnetic coil and the magnetic member by controlling the amount and polarity of electric current flowed to the electromagnetic coil.

The imaging apparatus is capable of moving the guide shafts stably and smoothly, because the magnetic member is situated in a vicinity of the center of gravity of the image pickup device or the image pickup device fixing member.

The imaging apparatus is capable of bringing the two wall surfaces of each shaft hole into stable contact with the respective two location on the outer peripheral surface of the corresponding guide shaft, because the two surfaces of each shaft hole is formed as the inclined surfaces designed in a way to come into contact with the respective two locations on the outer peripheral surface of the corresponding guide shaft in the optical axis direction of the photographing optical system.

The imaging apparatus is capable of easily sensing the posture of the imaging apparatus by sensing the direction in which the acceleration works on the imaging apparatus while photographing a subject, because the acceleration sensor is used as the posture sensor.

The imaging apparatus is capable of bringing the two wall surfaces of each shaft hole into contact with the corresponding guide shaft by use of the biasing force generated by the biasing part, and accordingly the imaging apparatus is capable of smoothly moving the guide shafts without looseness.

Although the preferred embodiments of the present invention have been described, it should be understood that the present invention is not limited to these embodiments, various modifications and changes can be made to the embodiments.

What is claimed is:

1. An imaging apparatus comprising:
  an image pickup device configured to receive a subject image entering through a photographing optical system, to image the subject image on a light receiving surface having a plurality of pixels, and to convert the subject image into an electric signal;
  a moving part configured to move the image pickup device, the moving part configured to retain the image pickup device movably in a plane perpendicular to an optical axis direction of the photographing optical system, the moving part including a guide shaft, a shaft bearing and an image pickup device fixing member to fix the image pickup device thereto, the shaft bearing having a shaft hole in which the guide shaft is inserted, the shaft hole having at least two wall surfaces;
  a controller configured to control the moving part to move the image pickup device; and
  a biasing part configured to generate a biasing force to bias the image pickup device fixing member to bring the wall surfaces of the shaft hole into contact with the guide shaft.

2. The An imaging apparatus according to claim 1, further comprising
  a biasing force controller configured to control the magnitude of the biasing force generated by the biasing part; and
  a posture sensor configured to sense the posture of the imaging apparatus while photographing the subject,
  wherein the controller includes a camera shake sensor and is configured to move the image pickup device on a basis of information on shake sensed by the camera shake sensor,
  wherein, on a basis of information on the posture of the imaging apparatus sensed by the posture sensor while photographing the subject, the biasing force controller is configured to control the biasing force generated by the biasing part.

3. The imaging apparatus according to claim 2,
  wherein the biasing part is a magnetic biasing part configured to generate the biasing force to bring the wall surfaces of the shaft hole into contact with the guide shaft by use of a magnetic attraction working in the optical axis direction of the photographing optical system.

4. The imaging apparatus according to claim 2,
  wherein the magnetic biasing part includes: a magnetic member adhered to the rear of any one of the image pickup device and the image pickup device fixing member; and an electromagnetic coil arranged opposed to the magnetic member on the rear side of the image pickup device.

5. The imaging apparatus according to claim 2,
  wherein the biasing force controller is configured to control an amount and polarity of electric current flowed to the electromagnetic coil on a basis of information on the posture of the imaging apparatus sensed by the posture sensor while photographing the subject, and thus controls the magnitude of magnetic attraction generated between the electromagnetic coil and the magnetic member.

6. The imaging apparatus according to claim 2,
  wherein the magnetic member is situated close to the center of gravity of any one of the image pickup device and the image pickup device fixing member.

7. The imaging apparatus according to claim 2,
  wherein the magnetic member is any one of a magnetic metal member and a permanent magnet.

8. The imaging apparatus according to claim 2,
  wherein the two wall surfaces of the shaft hole are inclined surfaces formed so as to come into contact with two locations on an outer peripheral surface of the guide shaft in the optical axis direction of the photographing optical system.

9. The imaging apparatus according to claim 2,
  wherein the posture sensor is an acceleration sensor configured to sense a direction in which acceleration works on the imaging apparatus, and thereby to sense the posture of the imaging apparatus while photographing the subject.

10. An imaging apparatus comprising:
  an image pickup device configured to receive a subject image entering through a photographing optical system, to image the subject image on a light receiving surface having a plurality of pixels, and to convert the subject image into an electric signal;
  a moving part configured to move the image pickup device, the moving part configured to retain the image pickup device movably in a plane perpendicular to an optical axis direction of the photographing optical system, the moving part including a guide shaft, a shaft bearing and an image pickup device fixing member to fix the image pickup device thereto, the shaft bearing having a shaft hole in which the guide shaft is inserted, the shaft hole having at least two wall surfaces;
  a controller including a camera shako sensor, the controller configured to control the moving part configured to move the image pickup device on a basis of information on shake sensed by the camera shake sensor so that the moving part moves the image pickup device;
  a biasing part configured to generate a biasing force to bias a part of the image pickup device moving member to bring the wall surfaces of the shaft hole into contact with the guide shaft;
  a biasing force controller configured to control the magnitude of the biasing force generated by the biasing part; and a posture sensor configured to sense the posture of the imaging apparatus while photographing the subject,
  wherein, on a basis of information on the posture of the imaging apparatus sensed by the posture sensor while photographing the subject, the biasing force controller is configured to control the biasing force generated by the biasing part.

* * * * *